US012598042B2

(12) United States Patent
Matsumura et al.

(10) Patent No.: US 12,598,042 B2
(45) Date of Patent: Apr. 7, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 240 days.

(21) Appl. No.: 18/269,413

(22) PCT Filed: Dec. 24, 2020

(86) PCT No.: PCT/JP2020/048530
§ 371 (c)(1),
(2) Date: Jun. 23, 2023

(87) PCT Pub. No.: WO2022/137453
PCT Pub. Date: Jun. 30, 2022

(65) Prior Publication Data
US 2024/0137176 A1     Apr. 25, 2024
US 2024/0235770 A9     Jul. 11, 2024

(51) Int. Cl.
H04L 5/00          (2006.01)

(52) U.S. Cl.
CPC .......... H04L 5/0051 (2013.01); H04L 5/0091 (2013.01)

(58) Field of Classification Search
CPC ..... H04L 5/0051; H04L 5/0091; H04L 5/001; H04L 5/0023; H04L 5/0048; H04W 16/28; H04W 56/00
See application file for complete search history.

(56) References Cited

U.S. PATENT DOCUMENTS

| | | | |
|---|---|---|---|
| 2022/0007342 A1* | 1/2022 | Khoshnevisan | H04L 5/0094 |
| 2023/0021510 A1* | 1/2023 | Guo | H04L 5/005 |
| 2023/0028824 A1* | 1/2023 | Zhang | H04L 5/0051 |
| 2024/0023045 A1* | 1/2024 | Da Silva | H04W 36/249 |

FOREIGN PATENT DOCUMENTS

WO     WO-2020129784 A1 *    6/2020    ............ H04W 74/08

OTHER PUBLICATIONS

Office Action issued in Japanese Patent Application No. 2022-570902, dated Nov. 12, 2024 (4 pages).
International Search Report issued in PCT/JP2020/048530 on Aug. 17, 2021 (2 pages).
Written Opinion of the International Searching Authority issued in PCT/JP2020/048530 on Aug. 17, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8)"; Mar. 2010 (149 pages).

* cited by examiner

*Primary Examiner* — Lakeram Jangbahadur
(74) *Attorney, Agent, or Firm* — Osha Bergman Watanabe & Burton LLP

(57)          ABSTRACT
A terminal according to one aspect of the present disclosure includes a receiving section that receives a synchronization signal block of a non-serving cell, and a control section that determines a transmission configuration indication (TCI) state of a demodulation reference signal for a physical downlink shared channel or a physical downlink control channel of a serving cell, based on the synchronization signal block of the non-serving cell. According to one aspect of the present disclosure, communication overhead can be suppressed in inter-cell mobility.

6 Claims, 15 Drawing Sheets

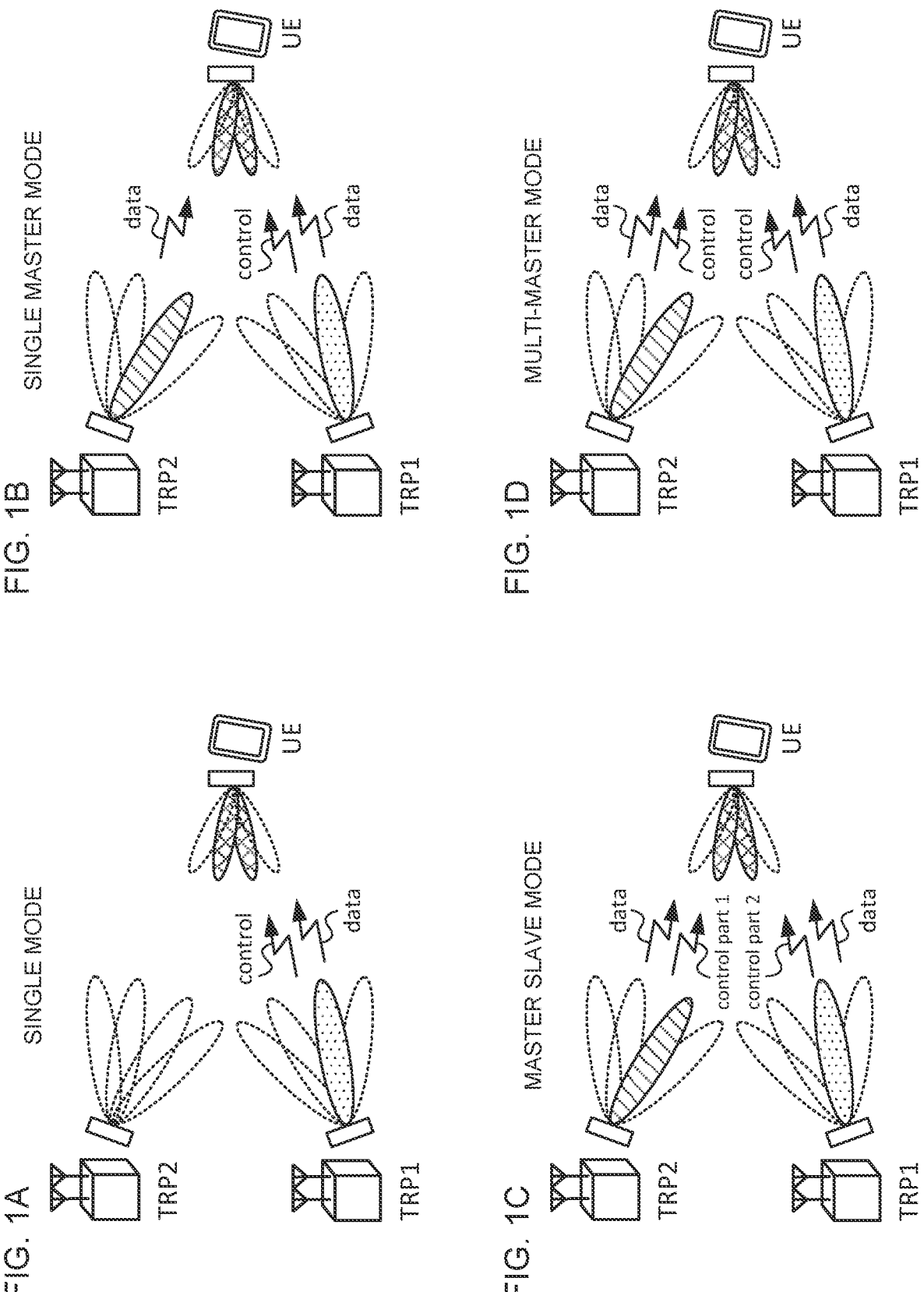

TRP2:SSB 32-63

PCI1

PDSCH2

DCI2

DCI1

UE

TRP2

TRP1

PDSCH1

TRP1:SSB 0-31

TRP2:SSB 0-63 (or 32-63)

PCI2

PDSCH2

DCI2

DCI1

UE

TRP2

TRP1

PDSCH1

PCI1

TRP1:SSB 0-63 (or 0-31)

SSB OF NON-SERVING CELL

QCL

CSI-RS/TRS OF SERVING CELL

QCL

DM-RS OF PDCCH/PDSCH OF SERVING CELL

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), in order to facilitate DL/UL beam management with higher efficiency (for implementing lower latency and overhead), layer 1/layer 2 (L1/L2) inter-cell mobility has been under study.

However, in a method of either explicitly updating a TCI state using Radio Resource Control (RRC) signaling/Medium Access Control Control Element (MAC CE)/Downlink Control Information (DCI) or the like or updating a TCI state based on PRACH transmission, there is an issue in that communication overhead is high due to RRC reconfiguration, transmission of the PRACH, and the like.

In view of this, the present disclosure has one object to provide a terminal, a radio communication method, and a base station that enable suppression of communication overhead in inter-cell mobility.

Solution to Problem

A terminal according to one aspect of the present disclosure includes a receiving section that receives a synchronization signal block of a non-serving cell, and a control section that determines a transmission configuration indication (TCI) state of a demodulation reference signal for a physical downlink shared channel or a physical downlink control channel of a serving cell, based on the synchronization signal block of the non-serving cell.

Advantageous Effects of Invention

According to one aspect of the present disclosure, communication overhead can be suppressed in inter-cell mobility.

BRIEF DESCRIPTION OF DRAWINGS

FIGS. 1A to 1D are each a diagram to show an example of a multi-TRP scenario.

Figure 2A:
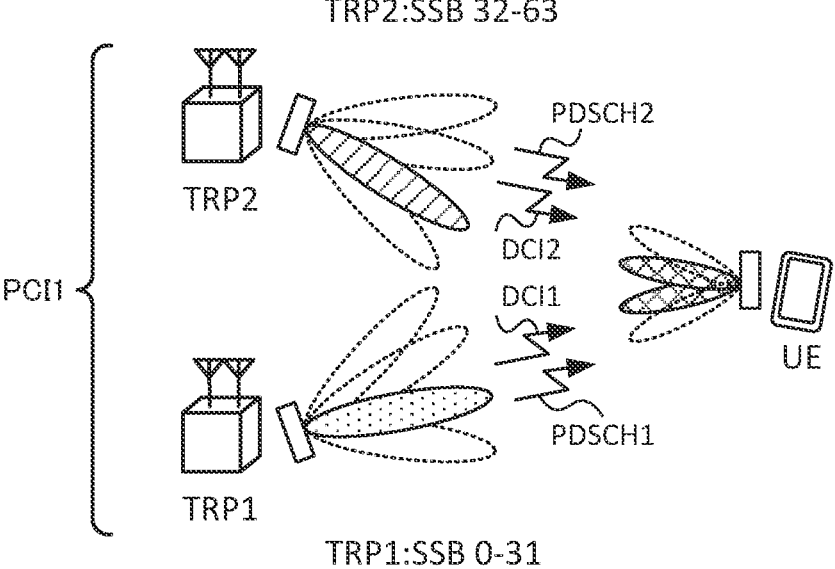
FIG. 2A is a diagram to show an example of intra-cell TRPs.

DESCRIPTION OF EMBODIMENTS (TCI, Spatial Relation, and QCL)

For NR, control of reception processing (for example, at least one of reception, demapping, demodulation, and decoding) and transmission processing (for example, at least one of transmission, mapping, precoding, modulation, and coding) in the UE regarding at least one of a signal and a channel (expressed as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, the higher layer signaling may be, for example, any one of Radio Resource Control (RRC) signaling, medium access control (MAC) signaling, broadcast information, and the like, or a combination of these.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a tracking reference signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state (RRC "TCI-state IE") configured using higher layer signaling may include one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero power CSI-RS (NZP CSI-RS) resource ID (Identifier)), an index of a cell in which the RS is located, and an index of a Bandwidth Part (BWP) in which the RS is located.

In Rel-15 NR, as the TCI state of at least one of the PDCCH and the PDSCH, both of the RS of QCL type A and the RS of QCL type D, or only the RS of QCL type A may be configured for the UE.

In a case where the TRS is configured as the RS for the QCL type A, unlike a demodulation reference signal (DMRS) for the PDCCH or the PDSCH, the TRS is assumed to be transmitted such that the same TRS is periodically transmitted for an extended period of time. The UE can measure the TRS and calculate the average delay, the delay spread, and the like.

In the TCI state of the DMRS for the PDCCH or the PDSCH, the UE configured with the TRS as the RS for the QCL type A can assume that the DMRS for the PDCCH or the PDSCH is the same as the QCL type A parameters (average delay, delay spread, and the like) for the TRS, and can thus determine the type A parameters (average delay, delay spread, and the like) for the DMRS for the PDCCH or the PDSCH from measurement results for the TRS. When performing channel estimation for at least one of the PDCCH and the PDSCH, the UE can use the measurement results for the TRS to perform more accurate channel estimation.

The UE configured with the RS for the QCL type D can use the RS for the QCL type D to determine the UE receive beam (spatial domain reception filter, and UE spatial domain reception filter).

The RS for QCL type X for the TCI state may mean the RS in the QCL type X relation with (the DMRS for) a certain channel/signal, and the RS may be referred to as a QCL source of the QCL type X for the TCI state.

(Multi-TRPs)

For NR, a scheme in which one or a plurality of transmission/reception points (TRPs) (multi-TRPs) perform DL transmission to the UE by using one or a plurality of panels (multi-panels) has been under study. A scheme in which the UE performs UL transmission to one or a plurality of TRPs has been under study as well.

Note that the plurality of TRPs may correspond to the same cell identifier (ID), or may correspond to different cell IDs. The cell ID may be a physical cell ID, or may be a virtual cell ID.

FIGS. 1A to 1D are each a diagram to show an example of a multi-TRP scenario. In these examples, it is assumed that each TRP can transmit four different beams. However, this is not restrictive.

FIG. 1A shows an example of a case (which may be referred to as a single mode, a single TRP, or the like) in which only one TRP (in the present example, TRP 1) out of the multi-TRPs performs transmission to the UE. In this case, TRP 1 transmits both of a control signal (PDCCH) and a data signal (PDSCH) to the UE.

FIG. 1B shows an example of a case (which may be referred to as a single master mode) in which only one TRP (in the present example, TRP 1) out of the multi-TRPs transmits a control signal to the UE, and the multi-TRPs transmit a data signal thereto. The UE receives each PDSCH transmitted from the multi-TRPs, based on one piece of downlink control information (DCI).

FIG. 1C shows an example of a case (which may be referred to as a master slave mode) in which each of the multi-TRPs transmits a part of a control signal to the UE, and the multi-TRPs transmit a data signal thereto. In TRP 1, part 1 of a control signal (DCI) may be transmitted, and in TRP 2, part 2 of the control signal (DCI) may be transmitted. Part 2 of the control signal may depend on part 1. The UE receives each PDSCH transmitted from the multi-TRPs, based on these parts of the DCI.

FIG. 1D shows an example of a case (which may be referred to as a multi-master mode) in which each of the multi-TRPs transmits different control signals to the UE, and the multi-TRPs transmit a data signal thereto. In TRP 1, a first control signal (DCI) may be transmitted, and in TRP 2, a second control signal (DCI) may be transmitted. The UE receives respective PDSCHs transmitted from the multi-TRPs, based on these pieces of DCI.

When a plurality of PDSCHs (which may be referred to as multi-PDSCHs (multiple PDSCH)) from the multi-TRPs as shown in FIG. 1B are scheduled using one piece of DCI, the piece of DCI may be referred to as single DCI (single PDCCH). When a plurality of PDSCHs from the multi-TRPs as shown in FIG. 1D are each scheduled using a plurality of pieces of DCI, the plurality of pieces of DCI may be referred to as multi-DCIs (multi-PDCCHs (multiple PDCCHs)).

From each TRP of the multi-TRPs, codewords (Code Words (CWs)) and layers different from one another may be transmitted. As one mode of multi-TRP transmission, non-coherent joint transmission (NCJT) has been under study.

In NCJT, for example, TRP 1 performs modulation mapping for a first codeword and then layer mapping to transmit a first PDSCH by using a first number of layers (for example, two layers) by means of first precoding. TRP 2 performs for modulation mapping a second codeword and then layer mapping to transmit a second PDSCH by using a second number of layers (for example, two layers) by means of second precoding.

Note that it may be defined that a plurality of PDSCHs (multi-PDSCHs) to be transmitted using NCJT partially or entirely overlap regarding at least one of the time and frequency domains. In other words, at least one of the time and frequency resources of the first PDSCH from the first TRP and the second PDSCH from the second TRP may overlap.

It may be assumed that the first PDSCH and the second PDSCH are not in a quasi-co-location (QCL) relationship (not quasi-co-located). Reception of the multi-PDSCHs may be interpreted as simultaneous reception of the PDSCHs that are not of a certain QCL type (for example, QCL type D).

For URLLC for the multi-TRPs, support of PDSCH (transport block (TB) or codeword (CW)) repetition across the multi-TRPs has been under study. Support of repetition schemes across the multi-TRPs (URLLC schemes, for example, schemes 1, 2a, 2b, 3, and 4) in the frequency domain, the layer (spatial) domain, or the time domain has been under study. In scheme 1, the multi-PDSCHs from the multi-TRPs are multiplexed by space division multiplexing (SDM). In schemes 2a and 2b, the PDSCH from the multi-TRPs is multiplexed by frequency division multiplexing (FDM). In scheme 2a, a redundancy version (RV) is the same for the multi-TRPs. In scheme 2b, the RV may be the same or may be different for the multi-TRPs. In schemes 3 and 4, the multi-PDSCHs from the multi-TRPs are multiplexed by time division multiplexing (TDM). In scheme 3, the multi-PDSCHs from the multi-TRPs are transmitted in one slot. In scheme 4, the multi-PDSCHs from the multi-TRPs are transmitted in different slots.

According to the multi-TRP scenario as described above, more flexible transmission control using a channel with satisfactory quality can be performed.

In the multi-master mode as shown in FIG. 1D, a configuration in which the same physical cell ID is configured for a plurality of TRPs (intra-TRP mobility, intra-cell TRP mobility, intra-cell mobility, or intra-cell multi-TRP operation) and a configuration in which different physical cell IDs are configured for a plurality of TRPs (inter-TRP mobility, inter-cell TRP mobility, inter-cell mobility, or inter-cell multi-TRP operation) are considered.

FIG. 2A is a diagram to show an example of intra-cell mobility. As shown in FIG. 2A, the same physical cell ID (PCI 1) is configured for TRP 1 and TRP 2. In this case, it is necessary that the SSBs (SSB indices) transmitted by TRP 1 and the SSBs transmitted by TRP 2 be different from each other. In the example of FIG. 2A, the SSBs of TRP 1 are from 0 to 31, and the SSBs of TRP 2 are from 32 to 63.

Figure 2B:
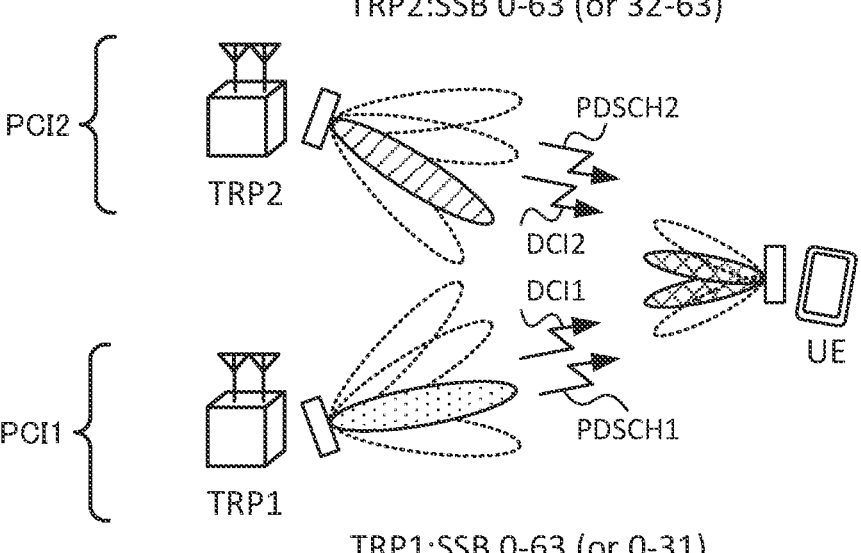
FIG. 2B is a diagram to show an example of inter-TRPs.

FIG. 2B is a diagram to show an example of inter-cell mobility. As shown in FIG. 2B, different physical cell IDs (PCI 1 and PCI 2) are configured for TRP 1 and TRP 2, respectively. In this case, the SSBs transmitted by TRP 1 and the SSBs transmitted by TRP 2 may overlap or may be different from each other. In the example of FIG. 2B, the SSBs of both of TRP 1 and TRP 2 may be from 0 to 63. Alternatively, the SSBs of TRP 1 may be from 0 to 31, and the SSBs of TRP 2 may be from 32 to 63. In this case, the RS for the TCI state of PDSCH 1/PDSCH 2 is PCI 1 or PCI 2.

(TCI State for TRS/CSI-RS/DMRS)

Regarding periodic CSI-RS resources in NZP-CSI-RS-ResourceSet configured with a higher layer parameter trs-Info, the UE may assume that the TCI state indicates one of the QCL types of the following (1-1) and (1-2).

(1-1) "QCL-TypeC" with SS/PBCH blocks, and if applicable, "QCL-TypeD" with the same SS/PBCH blocks.

(1-2) "QCL-TypeC" with SS/PBCH blocks, and if applicable, "QCL-TypeD" with CSI-RS resources in NZP-CSI-RS-ResourceSet configured together with a higher layer parameter "repetition."

Regarding aperiodic CSI-RS resources in NZP-CSI-RS-ResourceSet configured with the higher layer parameter trs-Info, the UE assumes that the TCI state indicates "QCL-TypeA". The "QCL-TypeA" has the aperiodic CSI-RS resources in NZP-CSI-RS-ResourceSet configured with the higher layer parameter trs-Info. If applicable, the UE may assume "QCL-TypeD" with the same periodic CSI-RS resources.

Regarding the CSI-RS resources in NZP-CSI-RS-ResourceSet configured without the higher layer parameter trs-Info and the higher layer parameter "repetition", the UE may assume that the TCI state indicates one of the QCL types of the following (2-1) to (2-4).

(2-1) "QCL-TypeA" with CSI-RS resources in NZP-CSI-RS-ResourceSet configured with the higher layer parameter trs-Info, and if applicable, "QCL-TypeD" with the same CSI-RS resources.

(2-2) "QCL-TypeA" with CSI-RS resources in NZP-CSI-RS-ResourceSet configured with the higher layer parameter trs-Info, and if applicable, "QCL-TypeD" with SS/PBCH blocks.

(2-3) "QCL-TypeA" with CSI-RS resources in NZP-CSI-RS-ResourceSet configured with the higher layer parameter trs-Info, and if applicable, "QCL-TypeD" with CSI-RS resources in NZP-CSI-RS-ResourceSet configured with the higher layer parameter repetition.

(2-4) If "QCL-TypeD" is not applied, "QCL-TypeB" with CSI-RS resources in NZP-CSI-RS-ResourceSet configured with the higher layer parameter trs-Info.

Regarding the CSI-RS resources in NZP-CSI-RS-ResourceSet configured with the higher layer parameter repetition, the UE may assume that the TCI state indicates one of the QCL types of the following (3-1) to (3-3).

(3-1) "QCL-TypeA" with CSI-RS resources in NZP-CSI-RS-ResourceSet configured with the higher layer parameter trs-Info, and if applicable, "QCL-TypeD" with the same CSI-RS resources.

(3-2) "QCL-TypeA" with CSI-RS resources in NZP-CSI-RS-ResourceSet configured with the higher layer parameter trs-Info, and if applicable, "QCL-TypeD" with CSI-RS resources in NZP-CSI-RS-ResourceSet configured with the higher layer parameter repetition.

(3-3) "QCL-TypeC" with SS/PBCH blocks, and if applicable, "QCL-TypeD" with the same SS/PBCH blocks.

Regarding the demodulation reference signal (DM-RS) for the PDCCH, the UE may assume that the TCI state indicates one of the QCL types of the following (4-1) to (4-3).

(4-1) "QCL-TypeA" with CSI-RS resources in NZP-CSI-RS-ResourceSet configured with the higher layer parameter trs-Info, and if applicable, "QCL-TypeD" with the same CSI-RS resources.

(4-2) "QCL-TypeA" having CSI-RS resources in NZP-CSI-RS-ResourceSet configured with the higher layer parameter trs-Info, and if applicable, "QCL-TypeD" with CSI-RS resources in NZP-CSI-RS-ResourceSet configured with the higher layer parameter repetition.

(4-3) "QCL-TypeA" with CSI-RS resources in NZP-CSI-RS-ResourceSet configured without the higher layer parameter repetition and the higher layer parameter trs-Info, and if applicable, "QCL-TypeD" with the same CSI-RS resources.

Regarding the DM-RS for the PDSCH, the UE may assume that the TCI state indicates one of the QCL types of the following (5-1) to (5-3).

(5-1) "QCL-TypeA" with CSI-RS resources in NZP-CSI-RS-ResourceSet configured with the higher layer parameter trs-Info, and if applicable, "QCL-TypeD" with the same CSI-RS resources.

(5-2) "QCL-TypeA" with CSI-RS resources in NZP-CSI-RS-ResourceSet configured with the higher layer parameter trs-Info, and if applicable, "QCL-TypeD" with CSI-RS resources in NZP-CSI-RS-ResourceSet configured with the higher layer parameter repetition.

(5-3) "QCL-TypeA" with CSI-RS resources in NZP-CSI-RS-ResourceSet configured without the higher layer parameter repetition and the higher layer parameter trs-Info, and if applicable, "QCL-TypeD" with the same CSI-RS resources.

(Inter-Cell Mobility)

Layer 1/layer 2 (L1/L2) inter-cell mobility to facilitate DL/UL beam management with higher efficiency (for implementing lower latency and overhead) has been under study. For example, on the assumption of multi-DCI based multi-PDSCH reception, enhancements related to the QCL/TCI to enable inter-cell multi-TRP operation may be carried out.

It is conceivable that combining information of a non-serving cell with at least a part of the TCIs received by the UE facilitates measurement and reporting of the RS of the non-serving cell. For example, whether to support beam indication for the TCIs associated with the RS of the non-serving cell (for example, update of TCI states and activation of necessary TCI states) has been under study. In this case, the RS of the non-serving cell may be provided as the QCL source of the DM-RS for the PDCCH/PDSCH.

In order to reduce interrupt handling at the time of crossing a boundary between the PCIs (changing the cell/PCI), permitting a QCL relationship between the RS of the serving cell and the RS of the non-serving cell is conceivable. The QCL source of the DM-RS for the PDCCH/PDSCH is a different type of CSI-RS, and an existing QCL relationship may be applied as it is. Thus, by combining information (QCL information, TCI state) of the non-serving cell with the TCI state of the CSI-RS, the UE can directly receive the DM-RS for the PDCCH/PDSCH from non-serving, using the information. Note that the number of non-serving cells is not limited to one.

The UE performs reception from only a single TRP at one time, and thus supports inter-PCI dynamic port selection (DPS). In the methods of Rel. 16 and earlier versions, the UE either explicitly updates the TCI state using RRC/MAC CE/DCI or updates the TCI state based on the newest (latest) PRACH transmission, and thereby updates (hands over) the PCI (cell).

However, in the methods of Rel. 16 and earlier versions, communication overhead is high due to transmission of the PRACH, RRC reconfiguration, and the like, and thus there is an issue in that data communication cannot be appropriately performed during an update procedure, for example.

In view of this, the inventors of the present invention came up with the idea of a terminal including a receiving section that receives a synchronization signal block of a non-serving cell, and a control section that determines a transmission configuration indication (TCI) state of a demodulation reference signal (DM-RS) for a physical downlink shared channel (PDSCH) or a physical downlink control channel (PDCCH) of a serving cell, based on the synchronization signal block (SSB) of the non-serving cell. According to one aspect of the present disclosure, high-speed inter-cell mobility can be implemented.

Embodiments according to the present disclosure will be described in detail with reference to the drawings as follows. The radio communication methods according to respective embodiments may each be employed individually, or may be employed in combination.

Note that, in the present disclosure, a panel, an Uplink (UL) transmission entity, a TRP, a TRP-ID, a TRP ID, a spatial relation, a control resource set (CORESET), a PDSCH, a codeword, a base station, a certain antenna port (for example, a demodulation reference signal (DMRS) port), a certain antenna port group (for example, a DMRS port group), a certain group (for example, a code division multiplexing (CDM) group, a certain reference signal group, or a CORESET group), and a CORESET pool may be interchangeably interpreted. A panel Identifier (ID) and a panel may be interchangeably interpreted.

In the present disclosure, a cell, a CC, a carrier, a BWP, and a band may be interchangeably interpreted.

In the present disclosure, an index, an ID, an indicator, and a resource ID may be interchangeably interpreted.

A TCI state, a TCI state or a QCL assumption, a QCL assumption, QCL information, a QCL parameter, a spatial domain reception filter, a UE spatial domain reception filter, a spatial domain filter, a UE receive beam, a DL receive beam, DL precoding, a DL precoder, a DL-RS, an RS of the QCL type D of a TCI state or a QCL assumption, and an RS of the QCL type A of a TCI state or a QCL assumption may be interchangeably interpreted. An RS of the QCL type D, a DL-RS associated with the QCL type D, a DL-RS having the QCL type D, a source of the DL-RS, an SSB, and a CSI-RS may be interchangeably interpreted.

In the present disclosure, the TCI state may be information (for example, the DL-RS, the QCL type, a cell in which the DL-RS is transmitted, or the like) related to a receive beam (spatial domain reception filter) indicated (configured) for the UE. The QCL assumption may be information (for example, the DL-RS, the QCL type, a cell in which the DL-RS is transmitted, or the like) related to a receive beam (spatial domain reception filter) that is assumed by the UE, based on transmission or reception of an associated signal (for example, a PRACH).

In the present disclosure, a spatial relation, spatial relation information, a spatial relation assumption, a QCL parameter, a spatial domain transmission filter, a UE spatial domain transmission filter, a spatial domain filter, a UE transmit beam, a UL transmit beam, UL precoding, a UL precoder, an RS of a spatial relation, a DL-RS, a QCL assumption, an SRI, a spatial relation based on an SRI, and a UL TCI may be interchangeably interpreted.

In the present disclosure, a TRS, a tracking CSI-RS, a CSI-RS having TRS information (higher layer parameter trs-Info), and NZP-CSI-RS resources in an NZP-CSI-RS resource set with TRS information may be interchangeably interpreted.

In the present disclosure, a beam, a spatial domain filter, a spatial setting, a TCI state, a TCI state pool, a plurality of TCI states, a UL TCI state, a unified TCI state, a unified beam, a common TCI state, a common beam, a QCL assumption, a QCL parameter, a spatial domain reception filter, a UE spatial domain reception filter, a UE receive beam, a DL beam, a DL receive beam, DL precoding, a DL precoder, a DL-RS, an RS of the QCL type D of a TCI state/QCL assumption, an RS of the QCL type A of a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with the QCL type X, a DL-RS having the QCL type X, a source of a DL-RS, an SSB, a CSI-RS, and an SRS may be interchangeably interpreted.

In the present disclosure, a normal TRP, a single TRP, a single TRP system, single TRP transmission, and a single PDSCH may be interchangeably interpreted. In the present disclosure, a multi-TRP, a multi-TRP system, multi-TRP transmission, and a multi-PDSCH may be interchangeably interpreted. In the present disclosure, a single DCI, a single PDCCH, a multi-TRP based on a single DCI, and activation of two TCI states on at least one TCI code point may be interchangeably interpreted.

In the present disclosure, a single TRP, a channel using a single TRP, a channel using one TCI state/spatial relation, no enabling of a multi-TRP using RRC/DCI, no enabling of a plurality of TCI states/spatial relations using RRC/DCI, configuration of a CORESET pool index (CORESET-PoolIndex) value for none of CORESETs and mapping of none of code points of a TCI field to two TCI states, performing communication with one transmission/reception point, and application of a single TRP may be interchangeably interpreted.

In the present disclosure, a multi-TRP, a channel using a multi-TRP, a channel using a plurality of TCI states/spatial relations, activation of a multi-TRP using RRC/DCI, enabling of a plurality of TCI states/spatial relations using RRC/DCI, and at least one of a multi-TRP based on a single DCI and a multi-TRP based on a multi-DCI may be interchangeably interpreted. In the present disclosure, a multi-TRP based on a multi-DCI and configuration of one CORE-SET pool index (CORESETPoolIndex) value for a CORESET may be interchangeably interpreted. In the present disclosure, a multi-TRP based on a single DCI and mapping of at least one code point of a TCI field to two TCI states may be interchangeably interpreted.

Embodiments according to the present disclosure will be described in detail with reference to the drawings as follows. The radio communication methods according to respective embodiments may each be employed individually, or may be employed in combination. Note that in the present disclosure, "A/B" may be interpreted as "at least one of A and B."

(Radio Communication Method)

First Embodiment

The UE may receive the SSB of the non-serving cell, and assume that the QCL source of the DM-RS for the PDSCH/PDCCH of the serving cell is the CSI-RS/TRS of the serving cell, and that the QCL source of the CSI-RS/TRS of the serving cell is the SSB of the non-serving cell. In other words, the UE may determine the TCI state of the DM-RS for the PDSCH/PDCCH of the serving cell, based on the SSB of the non-serving cell. The UE may perform reception/measurement of the DM-RS and channel estimation, based on the determined TCI state. The UE may perform reception/demodulation of the PDSCH/PDCCH, based on the determined TCI state.

Figure 3:
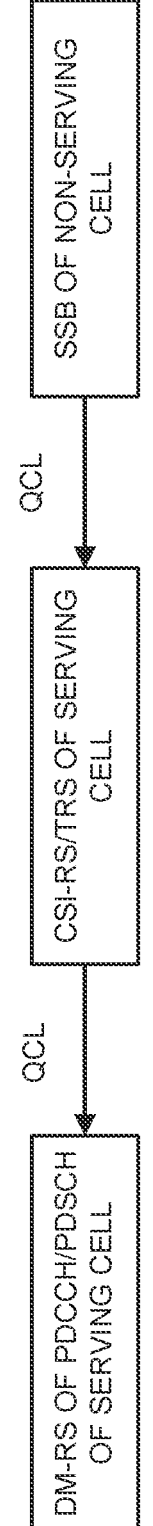
FIG. 3 is a diagram to show a QCL relationship according to a first embodiment.

FIG. 3 is a diagram to show a QCL relationship according to a first embodiment. The QCL relationship between the DM-RS for the PDSCH/PDCCH of the serving cell and the CSI-RS/TRS of the serving cell may be QCL type A or D, for example. The QCL relationship between the CSI-RS/TRS of the serving cell and the SSB of the non-serving cell may be QCL type C or D, for example.

In the present disclosure, that the QCL source of N is M, that N and M have a QCL relationship, that N and M have a relationship of the QCL type X, and that the TCI state of N indicates the QCL type X having M (QCL-typeX with M) may be interchangeably interpreted. X may be A, B, C, or D, for example. N and M may each be one of the DM-RS, the CSI-RS, the TRS, and the SSB for the PDSCH/PDCCH, for example. The DM-RS, the CSI-RS, the TRS, and the SSB for the PDSCH/PDCCH may be interpreted as the TCI state of the DM-RS for the PDSCH/PDCCH, the TCI state of the CSI-RS, the TCI state of the TRS, or the TCI state of the SSB. The SSB and the SS/PBCH block may be interchangeably interpreted.

Regarding the relationship between the DM-RS for the PDSCH/PDCCH of the serving cell and the CSI-RS/TRS of the serving cell, the UE may assume one of (4-1) to (5-3) described above.

Regarding the relationship between the CSI-RS/TRS of the serving cell and the SSB (SS/PBCH block) of the non-serving cell, the UE may assume (1-1) or (1-2) described above. The QCL source of the CSI-RS/TRS of the serving cell may be at least one of the CSI-RS and the SSB (SS/PBCH block) of the non-serving cell, and in that case, the UE may assume any one of (2-1) to (3-3).

According to the first embodiment, the RS (SSB) of the non-serving cell can be applied as the QCL source, using existing specifications. For example, even when the serving cell is changed due to inter-cell mobility, the TCI state can be determined with the RS (SSB) of the non-serving cell being applied unchanged. Therefore, RRC reconfiguration and the like no longer need to be performed, and accordingly communication overhead can be suppressed.

Second Embodiment

The UE may receive the SSB of the non-serving cell, and assume that the QCL source of the DM-RS for the PDSCH/PDCCH of the serving cell is the RS (for example, the SSB/CSI-RS/TRS) of the non-serving cell. In other words, the UE may determine the TCI state of the DM-RS for the PDSCH/PDCCH of the serving cell, based on the SSB of the non-serving cell. The UE may perform reception/measurement of the DM-RS and channel estimation, based on the determined TCI state. The UE may perform reception/demodulation of the PDSCH/PDCCH, based on the determined TCI state. The QCL source may be a direct or indirect QCL source.

The indirect QCL source may be QCL information not explicitly indicated (notified) by RRC/MAC CE/DCI or the like, and may be the SSB related to the newest (latest) PRACH transmission, for example. The direct QCL source may be QCL information explicitly indicated (notified) by RRC/MAC CE/DCI or the like, and may be included in the TCI state, for example.

Figure 4:
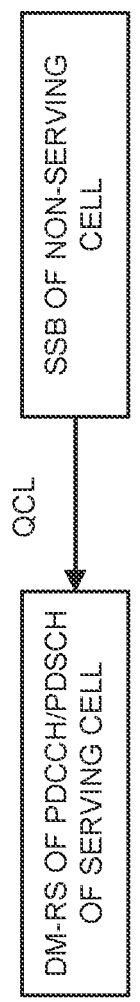
FIG. 4 is a diagram to show a first example of a QCL relationship according to a second embodiment.

FIG. 4 is a diagram to show a first example of a QCL relationship according to a second embodiment. As shown in FIG. 4, the QCL source (indirect QCL source) of the DM-RS for the PDSCH/PDCCH of the serving cell may be the SSB of the non-serving cell.

Figure 5:
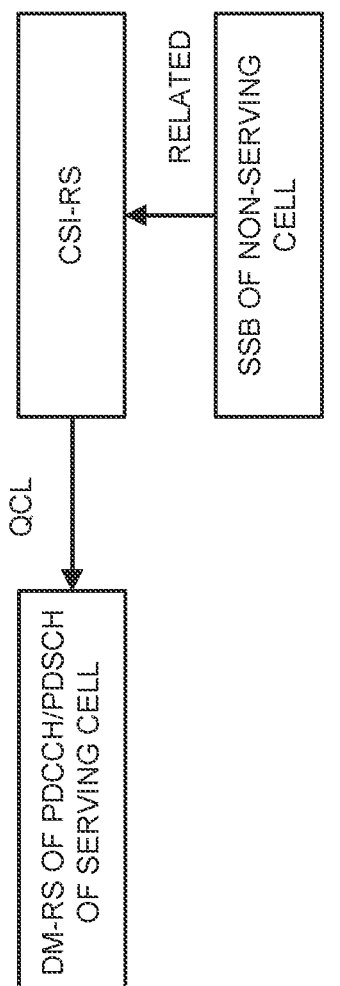
FIG. 5 is a diagram to show a second example of a QCL relationship according to the second embodiment.

FIG. 5 is a diagram to show a second example of a QCL relationship according to the second embodiment. As shown in FIG. 5, the direct or indirect QCL source of the DM-RS for the PDSCH/PDCCH of the serving cell may be the CSI-RS related to the SSB of the non-serving cell. The CSI-RS of FIG. 5 may be interpreted as the TRS. The CSI-RS may be the CSI-RS of the serving cell, or may be the CSI-RS of the non-serving cell.

Figure 6:
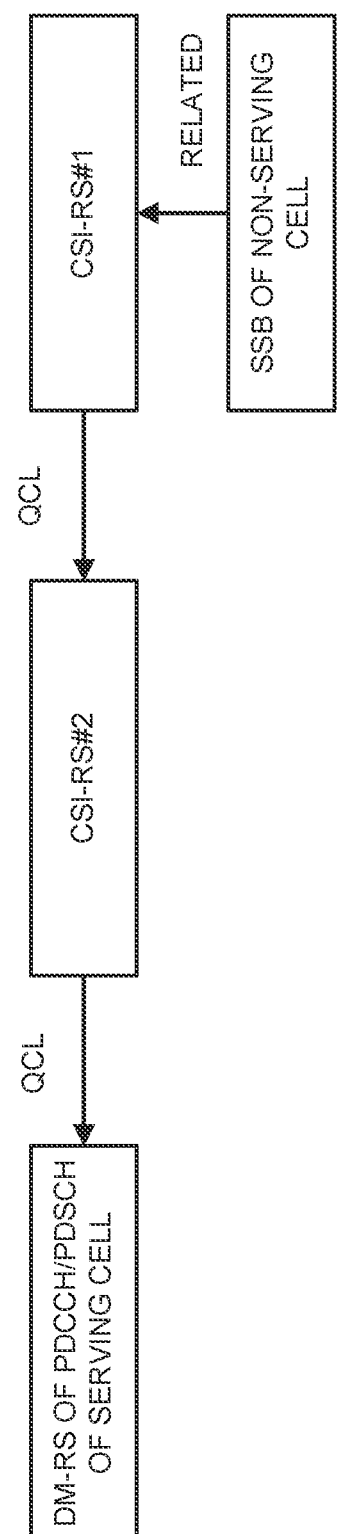
FIG. 6 is a diagram to show a third example of a QCL relationship according to the second embodiment.

FIG. 6 is a diagram to show a third example of a QCL relationship according to the second embodiment. As shown in FIG. 6, the QCL source of CSI-RS #2 may be CSI-RS #1 related to the SSB of the non-serving cell, and the QCL source of the DM-RS for the PDSCH/PDCCH may be CSI-RS #2. At least one of the CSI-RSs of FIG. 6 may be interpreted as the TRS. CSI-RS #1 may be the CSI-RS of the serving cell, or may be the CSI-RS of the non-serving cell. CSI-RS #2 may be the CSI-RS of the serving cell, or may be the CSI-RS of the non-serving cell.

For example, the UE may perform assumption, in which the "CSI-RS resources" in (4-1) to (5-3) described above are replaced with the "SSB (SS/PBCH block).

According to the second embodiment, the TCI state of the DM-RS for the PDSCH/PDCCH of the serving cell can be easily determined. Similarly to the first embodiment, communication overhead can be suppressed.

Figure 7:
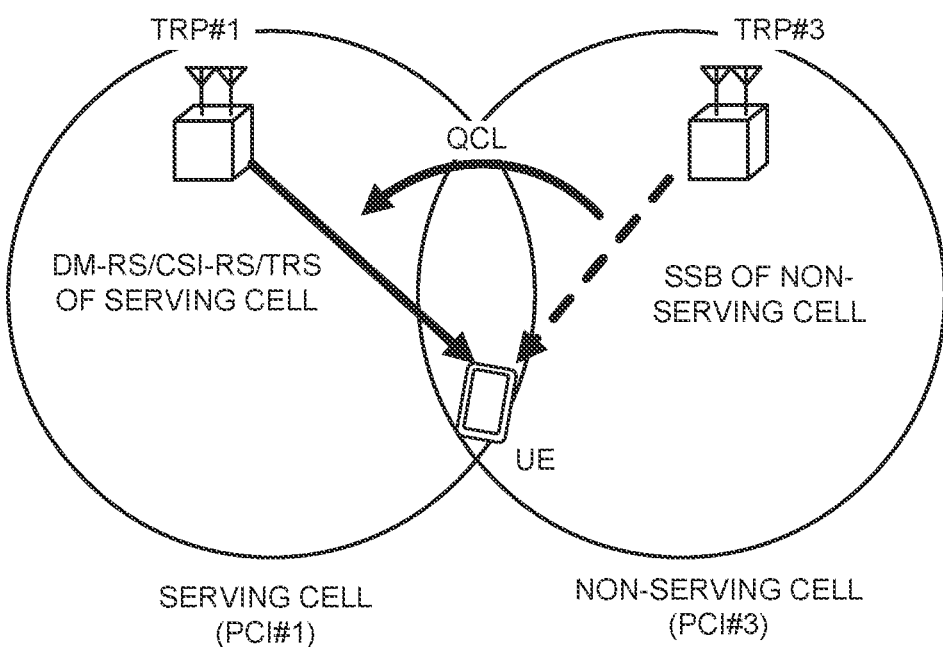
FIG. 7 is a diagram to show a first example of RS transmission according to the first embodiment and the second embodiment.

FIG. 7 is a diagram to show a first example of RS transmission according to the first embodiment and the second embodiment. In the example of FIG. 7, the DM-RS/CSI-RS/TRS for the PDSCH/PDCCH of the serving cell having a QCL relationship with the SSB of the non-serving cell (PCI #3) is transmitted from TRP #1 in the serving cell (PCI #1) to the UE. The SSB of the non-serving cell (PCI #3) is transmitted from TRP #3 to the UE. In the present example, the indirect QCL source of the DM-RS for the PDSCH/PDCCH of the serving cell may be the SSB of the non-serving cell. In the present example, the direct or indirect QCL source of the DM-RS for the PDSCH/PDCCH of the serving cell may be the CSI-RS/TRS of the serving cell, and the CSI-RS/TRS may be associated with the SSB of the non-serving cell.

Figure 8:
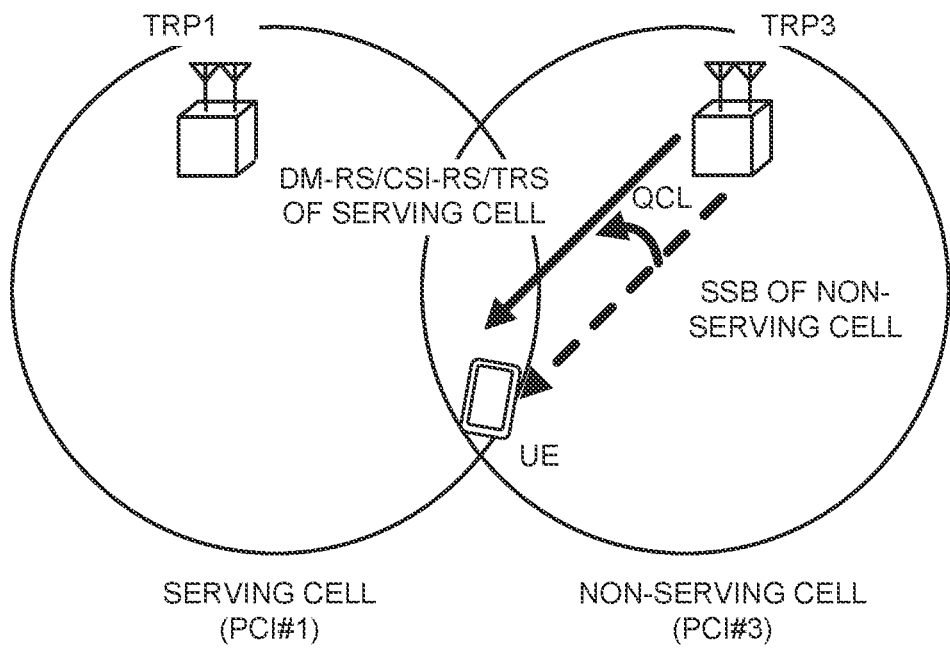
FIG. 8 is a diagram to show a second example of RS transmission according to the first embodiment and the second embodiment.

FIG. 8 is a diagram to show a second example of RS transmission according to the first embodiment and the second embodiment. In the example of FIG. 8, the DM-RS/CSI-RS/TRS for the PDSCH/PDCCH of the serving cell is transmitted from TRP #3 in the non-serving cell (PCI #3) to the UE, which is different from the example of FIG. 7. In the present example, the DM-RS for the PDSCH/PDCCH of the serving cell may be the DM-RS of the non-serving cell. In the present example, the indirect QCL source of the DM-RS for the PDSCH/PDCCH of the serving cell may be the SSB of the non-serving cell. In the present example, the direct or indirect QCL source of the DM-RS for the PDSCH/PDCCH of the serving cell may be the CSI-RS/TRS of the non-serving cell, and the CSI-RS/TRS may be associated with the SSB of the non-serving cell.

In the first embodiment and the second embodiment, the UE may assume the example of FIG. 7, or may assume the example of FIG. 8. In other words, the UE may assume that a higher layer parameter corresponding to the DM-RS/CSI-RS/TRS for the PDSCH/PDCCH is configured in the serving cell, or may assume that the higher layer parameter is configured in the non-serving cell.

Third Embodiment

The UE may update the TCI state of the DM-RS for the PDCCH/PDSCH, and may update (may switch) assumption of a higher layer parameter (Serving cell config) related to the serving cell, depending on whether the RS (CSI-RS/SSB) related to (having a QCL relationship with) the QCL source (CSI-RS/TRS/SSB) of the TCI state is an RS of the serving cell or an RS of the non-serving cell. When the RS related to the QCL source of the TCI state is an RS of the non-serving cell, the UE may perform one of first to fourth aspects to be described below. For example, in the first aspect (in a case in which a plurality of cells have substantially the same serving cell configurations), the UE may apply the first embodiment. For example, in at least one of the second to fourth aspects (in a case in which a plurality of serving cell configurations (candidates) for the non-serving cell are configured), the UE may apply at least one of the second and third embodiments. The first to fourth aspects presuppose the single TRP, but may presuppose the multi-TRP.

Figure 9:
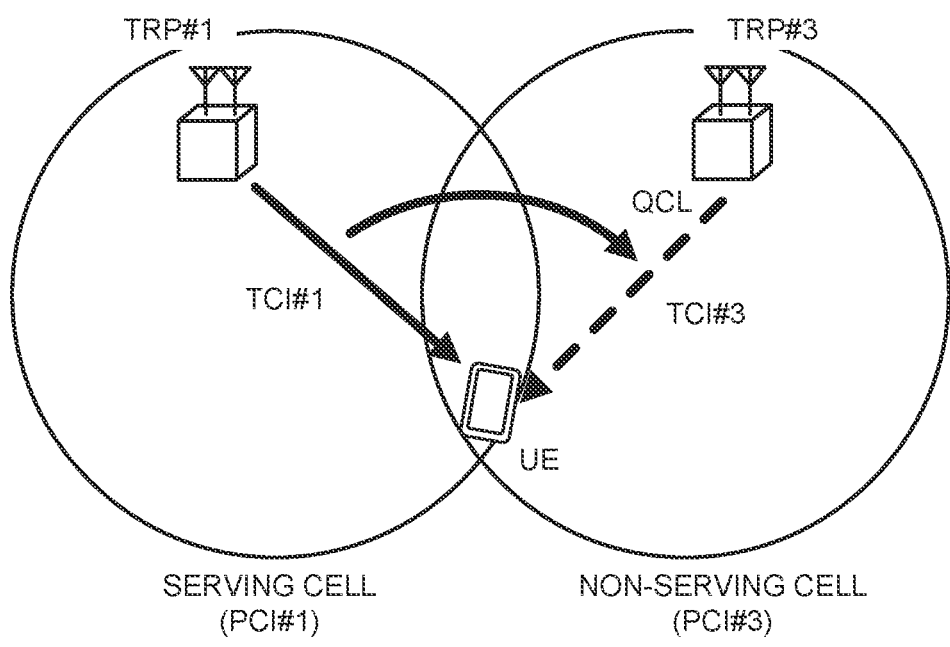
FIG. 9 is a diagram to show an example of switching of TCI states according to a third embodiment.

FIG. 9 is a diagram to show an example of switching of the TCI states according to the third embodiment. The UE that receives an indication for update from TCI #1 to TCI #3 (the UE that updates a QCL state) refers to a higher layer parameter (RRC parameter) related to a cell associated with updated TCI #3, and overwrites its assuming Serving cell config. The cell corresponding to TCI #3 is, for example, a cell of the SSB to which the RS of at least one QCL type (for example, the RS of the type D) configured for the TCI state is related.

Figure 10A:
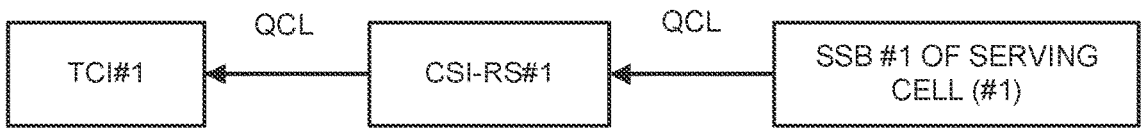
FIG. 10A is a diagram to show a QCL relationship of an RS in a serving cell.

FIG. 10A is a diagram to show a QCL relationship of an RS in the serving cell. The QCL source of TCI #1 is CSI-RS #1, and the QCL source of CSI-RS #1 is the SSB of serving cell #1. The cell associated with TCI #1 may be, for example, a cell (cell #1) of the SSB to which the RS of at least one QCL type (for example, the RS of the type D) configured for the TCI state is related.

Figure 10B:
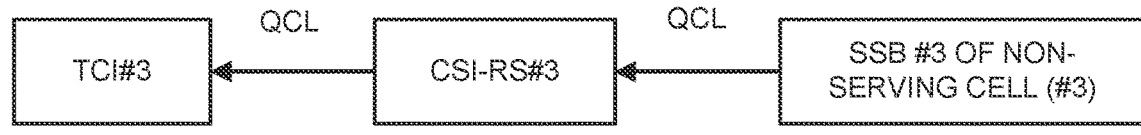
FIG. 10B is a diagram to show a QCL relationship of an RS in a non-serving cell.

FIG. 10B is a diagram to show a QCL relationship of an RS in the non-serving cell. The QCL source of TCI #3 is CSI-RS #3, and the QCL source of CSI-RS #3 is the SSB of non-serving cell #3. The cell associated with TCI #3 may be, for example, a cell (cell #3) of the SSB to which the RS of at least one QCL type (the RS of the type D) configured for the TCI state is related.

First Aspect

When communication is to be performed with one TRP (when the single TRP is applied), layer 1/layer 2 (L1/L2) inter-cell mobility of the UE is configured for only a plurality of cells having substantially the same serving cell configurations. For example, when at least one of configurations of the PDCCH/PDSCH (DL BWP configurations) and configurations of the PUCCH/PUSCH (UL BWP configurations) in a plurality of cells is the same, L1/L2 inter-cell mobility may be configured. When configurations other than configurations of the QCL/PCI/SSB/CSI-RS/SRS are the same, L1/L2 inter-cell mobility may be configured.

In this case, the UE can perform inter-cell mobility (handover), using an indication by MAC CE/DCI, without receiving configurations by RRC signaling.

Figure 11:
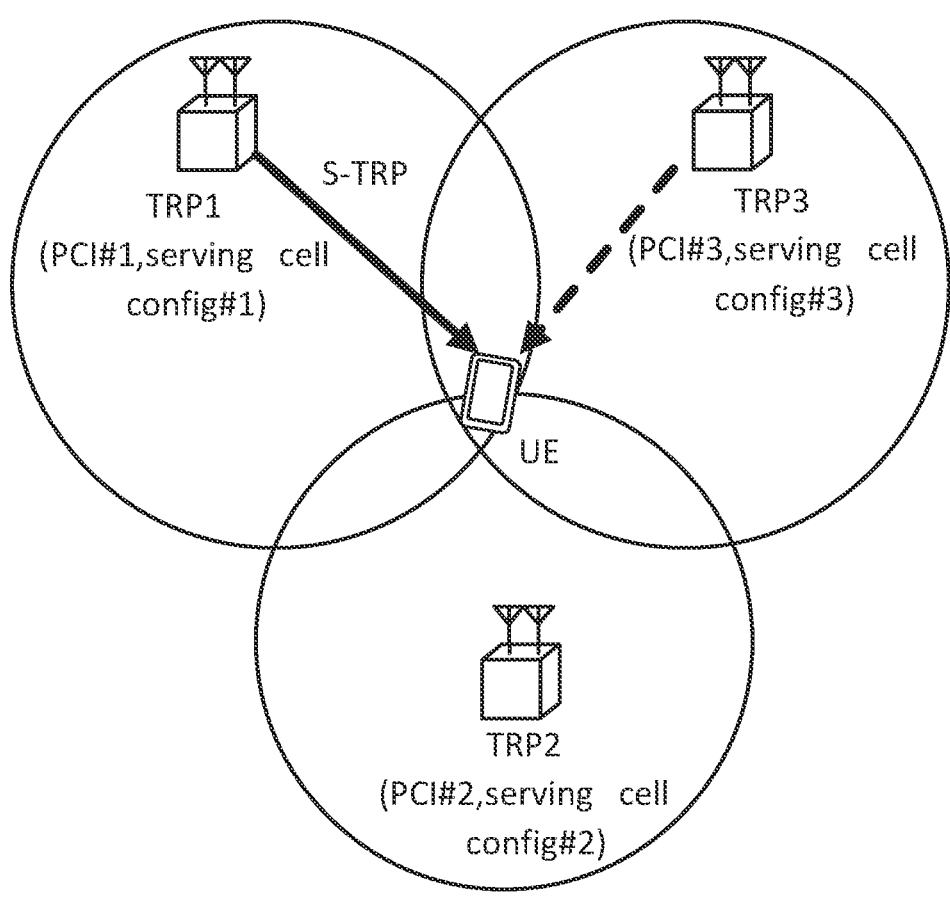
FIG. 11 is a diagram to show an application example of a single TRP.

FIG. 11 is a diagram to show an application example of the single TRP. In FIG. 11, only one TRP (TRP 1) of the multi-TRPs performs transmission to the UE. The serving cell configuration (serving cell config #1) of TRP 1 and the serving cell configuration (serving cell config #3) of TRP 3 are substantially the same as described above, and L1/L2 inter-cell mobility is configured for TRP 1 and TRP 3.

For example, when at least one of the following (1) to (3) is satisfied, L1/L2 inter-cell mobility may be configured between the cells.

(1) The serving cell configurations between the cells are the same.

(2) At least the configurations of the PDCCH/PDSCH are the same between a plurality of cells.

(3) Of at least one of the configurations of the PDCCH/PDSCH/PUCCH/PUSCH, configurations other than configurations of the QCL/PCI/SSB/CSI-RS/SRS are the same.

Second Aspect

When communication is to be performed with one TRP (when the single TRP is applied), the UE receives configurations of a plurality of candidate serving cells being non-serving cells corresponding to frequencies by higher layer signaling (RRC reconfiguration signaling) in advance. Then, when the UE receives an indication indicating one of the plurality of candidate serving cells by MAC CE/DCI, the UE changes (hands over) the serving cell to the candidate serving cell indicated in the indication. Note that the configuration of the candidate serving cell and the candidate serving cell configuration may be interchangeably interpreted.

An upper limit may be set for the number of candidate serving cell configurations. The upper limit may be a fixed value, or may be a variable value that is configured by higher layer signaling or the like. In order to enable L1/L2 inter-cell mobility, the UE receives an indication for serving cell change by MAC CE/DCI.

When the UE receives the MAC CE/DCI for indicating serving cell change (update), the UE waits for a specific period of time and then changes to the indicated serving cell, which has an updated serving cell configuration. The specific period of time may be X ms/X symbols from the indication of the MAC CE/DCI. The specific period of time may be Y ms/Y symbols from HARQ-ACK feedback for the MAC CE/DCI.

The MAC CE/DCI for indicating serving cell change may include a serving cell index, a PCI, or another ID related to the serving cell. The UE may determine that other fields in the MAC CE/DCI are indications related to serving to be changed to.

For example, in the example of FIG. 11, when the second aspect is applied, the UE is configured with candidate serving cell configurations (the serving cell configuration (serving cell config #2) of TRP 2 and the serving cell configuration (serving cell config #3) of TRP 3), as well as the serving cell configuration (serving cell config #1) of TRP 1. Then, when the UE receives MAC CE/DCI for indicating serving cell change, the UE updates the serving cell configuration to the candidate serving cell configuration.

For example, when the UE receives MAC CE/DCI for indicating the serving cell configuration of TRP 2, the UE changes the serving cell configuration to the serving cell configuration of TRP 2, and changes (hands over) the serving cell to the serving cell of TRP 2.

According to the second aspect, serving cell change (handover) is performed with an indication of MAC CE/DCI, using the candidate serving cell configurations received in advance.

Therefore, rapid inter-cell mobility can be implemented.

Third Aspect

Control combining the first aspect and the second aspect may be performed. The UE receives (is configured with) configurations of a plurality of candidate serving cells being non-serving cells corresponding to frequencies by higher layer signaling (RRC reconfiguration signaling). Then, when the UE receives information (QCL/TCI) related to a QCL of a non-serving cell by MAC CE or DCI, the UE changes (hands over) the serving cell to a candidate serving cell corresponding to (related to) the non-serving cell, and applies the QCL.

For example, when the UE receives an indication of a QCL/TCI related to an RS of a non-serving cell for the PDSCH by DCI, the UE may wait for a specific period of time and then change the serving cell to the non-serving cell (candidate serving cell), using a configuration of the candidate serving cell corresponding to (related to) the non-serving cell, and apply the indicated QCL/TCI. The specific period of time may be the same as that described in the second aspect.

For example, when a QCL/TCI related to an RS of a non-serving cell is activated for the PDCCH/PDSCH by MAC CE, the UE may change the serving cell to the non-serving cell (candidate serving cell), using a configuration of the candidate serving cell corresponding to (related to) the non-serving cell, and apply the activated QCL/TCI.

Note that it is preferable that all of the QCLs/TCIs activated for the PDCCH/PDSCH by MAC CE be related to the same serving cell. This can prevent dynamic (frequent) change of the serving cell configurations.

Fourth Aspect

When the UE is configured with a plurality of candidate serving cell configurations corresponding to frequencies, the UE may simultaneously apply/maintain/support/store at least two (a plurality of) candidate serving cell configurations out of the plurality of candidate serving cell configurations. The UE may simultaneously perform communication with a plurality of serving cells corresponding to the plurality of candidate serving cell configurations. This is a procedure similar to Dual active protocol stack based handover (DAPS HO). In other words, the UE simultaneously applies candidate serving cell configurations before change and candidate serving cell configurations after change for a specific period of time in handover. Then, when the UE receives an indication indicating one of the plurality of candidate serving cells, the UE changes (hands over) to the candidate serving cell indicated in the indication.

An upper limit may be set for the number of configurations (number of candidate serving cells). The upper limit may be a fixed value, or may be a variable value that is configured by higher layer signaling or the like.

When the UE is configured/indicated/activated with different QCLs/TCIs related to both of an RS of the serving cell and an RS of the non-serving cell for the PDCCH/PDSCH by MAC CE/DCI, the UE may perform the above processing (processing of the fourth aspect).

The UE maintains/supports/stores two serving cell configurations, with both of the cells corresponding to frequencies being serving cells. Then, the UE simultaneously receives DL signals from the two serving cells. In actual reception of the DL signals, Time Division Multiplexing (TDM) or Space Division Multiplexing (SDM) is used, based on a UE capability. For reception of different/dynamic PDCCHs/PDSCHs related to different cells, the UE uses different serving cell configurations.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
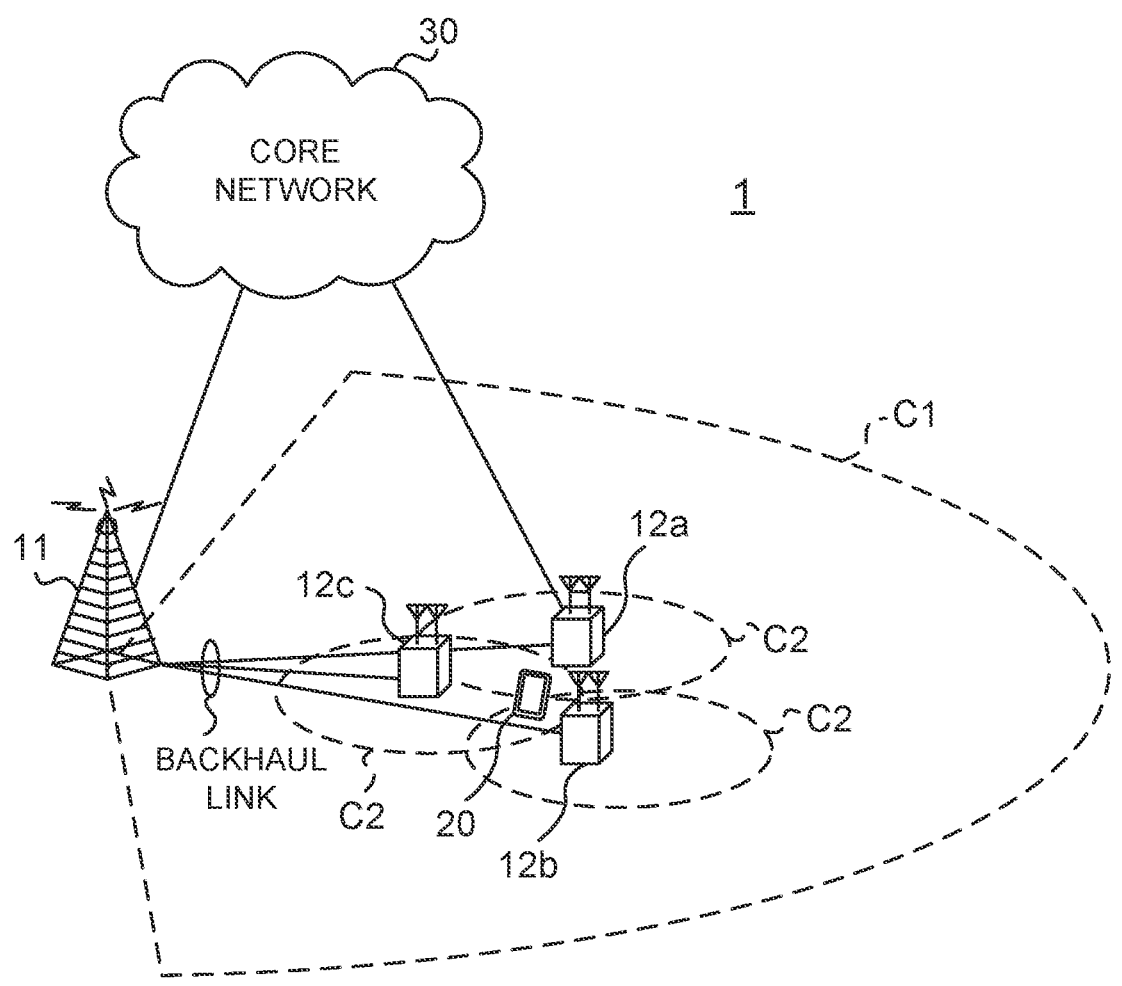
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
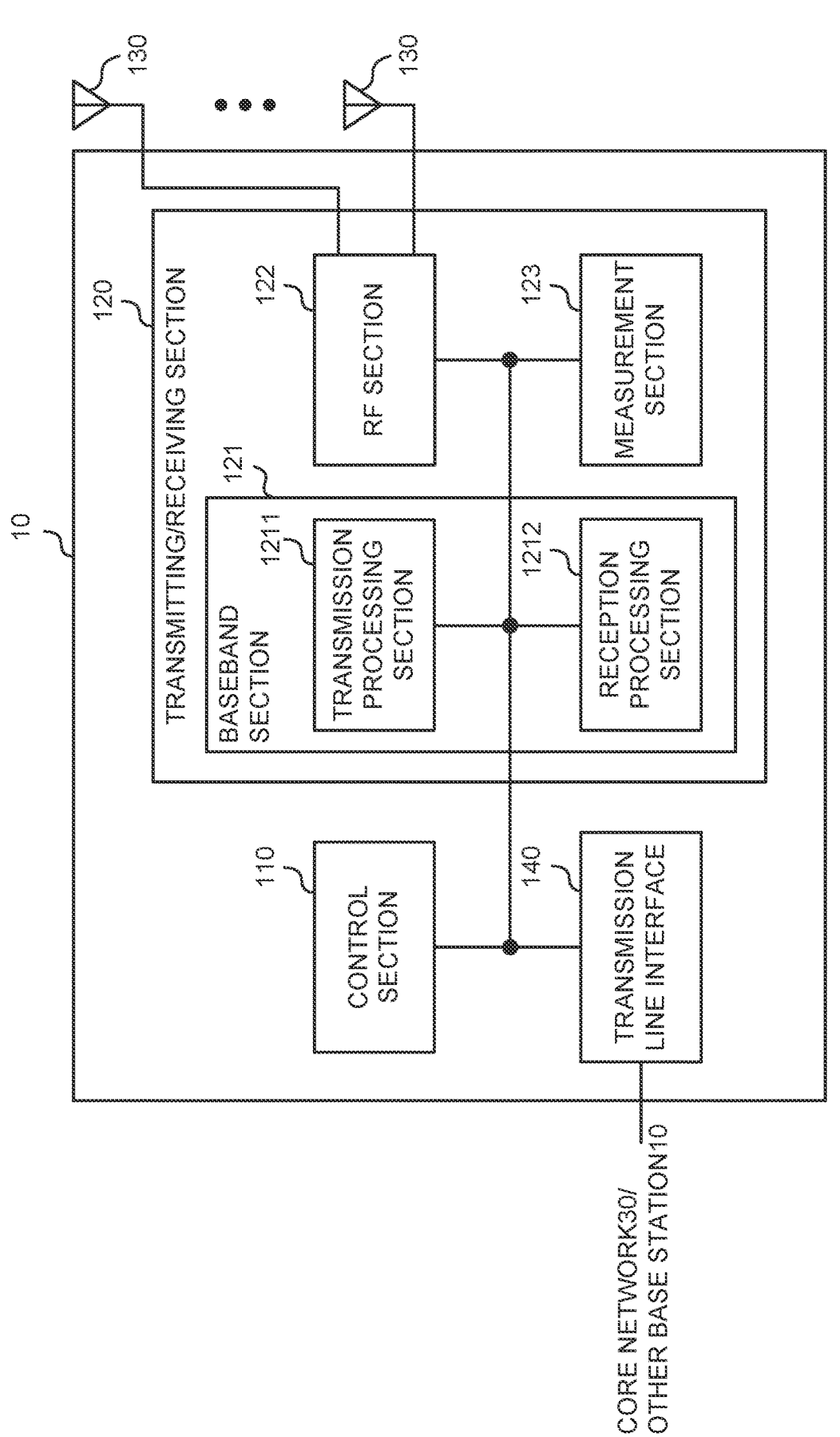
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit a synchronization signal block of a non-serving cell.

The control section 110 may control a transmission configuration indication (TCI) state of a demodulation reference signal for a physical downlink shared channel or a physical downlink control channel of a serving cell, which corresponds to the synchronization signal block of the non-serving cell.

(User Terminal)

Figure 14:
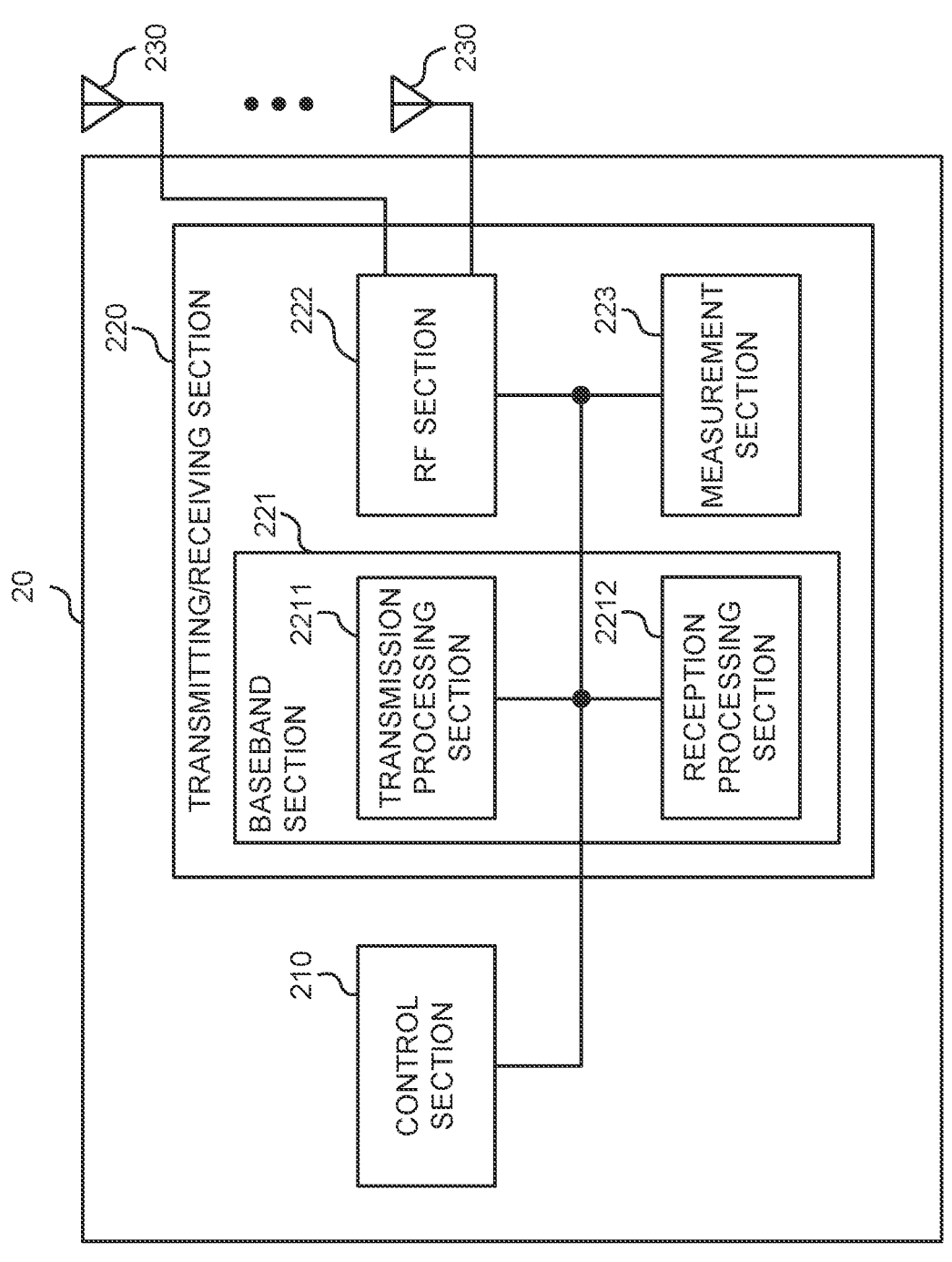
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a synchronization signal block of a non-serving cell.

The control section 210 may determine a transmission configuration indication (TCI) state of a demodulation reference signal for a physical downlink shared channel or a physical downlink control channel of a serving cell, based on the synchronization signal block of the non-serving cell. The control section 210 may assume that a quasi-co-location source of the demodulation reference signal is a channel state information reference signal or a tracking reference signal of the serving cell, and that a quasi-co-location source of the channel state information reference signal or the tracking reference signal is the synchronization signal block of the non-serving cell. The control section 210 may assume that a quasi-co-location source of the demodulation reference signal is the synchronization signal block of the non-serving cell. The control section 210 may update assumption of a higher layer parameter related to the serving cell, depending on whether a reference signal related to a quasi-co-location source of the transmission configuration indication state of the demodulation reference signal is a reference signal of the serving cell or a reference signal of the non-serving cell.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
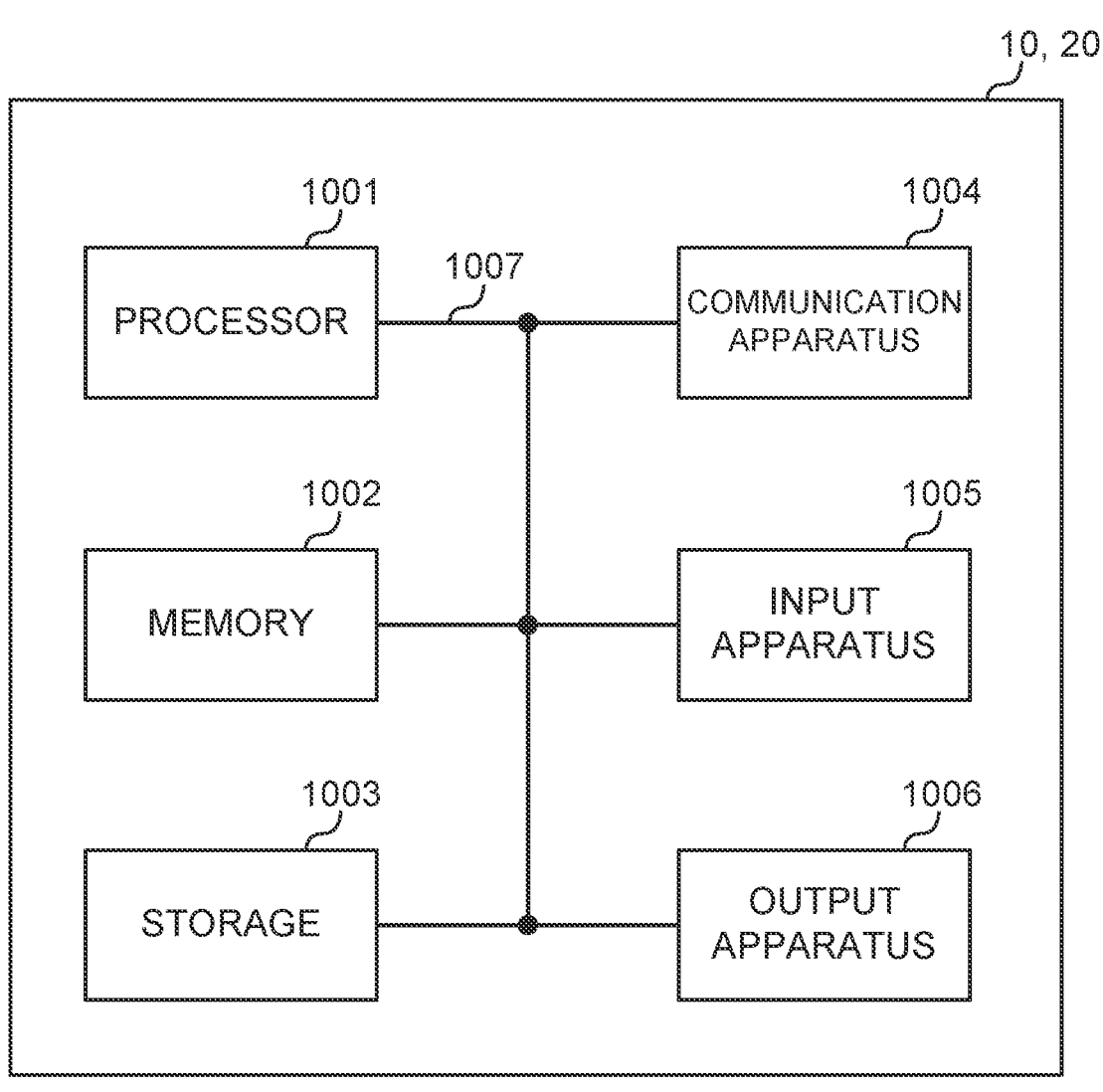
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EE-PROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink," "downlink," and the like may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a synchronization signal block (SSB) of a non-serving cell; and a processor that determines that a transmission configuration indication (TCI) state of a reference signal indicates a specific quasi co-location (QCL) type with the SSB of the non-serving cell, wherein the receiver receives a serving cell configuration in which a serving cell and the non-serving cell have same uplink and downlink bandwidth part (BWP) configurations and receives the serving cell configuration in which the serving cell and the non-serving cell have different SSB configurations, and inter-cell multi-transmission/Reception Point (TRP) operation is configured for the terminal.

2. The terminal according to claim 1, wherein the reference signal is a channel state information reference signal (CSI-RS).

3. The terminal according to claim 1, wherein the reference signal is a CSI-RS in a non-zero power (NZP)-CSI-RS resource set with tracking reference signal (TRS) information.

4. A radio communication method for a terminal, comprising:

receiving a synchronization signal block (SSB) of a non-serving cell;

determining that a transmission configuration indication (TCI) state of a reference signal indicates a specific quasi co-location (QCL) type with the SSB of the non-serving cell; and receiving a serving cell configuration in which a serving cell and the non-serving cell have same uplink and downlink bandwidth part (BWP) configurations and receiving the serving cell configuration in which the serving cell and the non-serving cell have different SSB configurations, wherein inter-cell multi-transmission/Reception Point (TRP) operation is configured for the terminal.

5. A base station comprising:

a transmitter that transmits a synchronization signal block (SSB) of a non-serving cell; and a processor that controls a transmission configuration indication (TCI) state of a reference signal, the TCI state indicating a specific quasi co-location (QCL) type with the SSB of the non-serving cell, wherein the transmitter transmits a serving cell configuration in which a serving cell and the non-serving cell have same uplink and downlink bandwidth part (BWP) configurations and transmits the serving cell configuration in which the serving cell and the non-serving cell have different SSB configurations, and inter-cell multi-transmission/Reception Point (TRP) operation is configured for a terminal.

6. A system comprising a terminal and a base station, wherein the base station comprises:

a transmitter that transmits a synchronization signal block (SSB) of a non-serving cell, and the terminal comprises:

a receiver that receives the SSB of the non-serving cell; and a processor that determines that a transmission configuration indication (TCI) state of a reference signal indicates a specific quasi co-location (QCL) type with the SSB of the non-serving cell, wherein the receiver receives a serving cell configuration in which a serving cell and the non-serving cell have same uplink and downlink bandwidth part (BWP) configurations and receives the serving cell configuration in which the serving cell and the non-serving cell have different SSB configurations, and inter-cell multi-transmission/Reception Point (TRP) operation is configured for the terminal.

* * * * *